March 9, 1965 J. RABINOW ETAL 3,173,126

READING MACHINE WITH CORE MATRIX

Filed Nov. 16, 1961 3 Sheets-Sheet 1

INVENTOR.
Arthur W. Holt
BY Jacob Rabinow
Joseph A. Genovese &
Max L. Libman
Attorneys INVENTOR
Arthur W. Holt
Jacob Rabinow
BY Joseph A. Genovese &
Max L. Libman
ATTORNEYS

READING MACHINE WITH CORE MATRIX

Filed Nov. 16, 1961 3 Sheets-Sheet 3

INVENTOR
Arthur W. Holt
Jacob Rabinow

BY Joseph A. Genovese & Max L. Libman

ATTORNEYS

United States Patent Office 3,173,126

Patented Mar. 9, 1965

3,173,126

READING MACHINE WITH CORE MATRIX

Jacob Rabinow, Takoma Park, and Arthur W. Holt, Silver Spring, Md., assignors, by mesne assignments, to Control Data Corporation, Minneapolis, Minn., a corporation of Minnesota Filed Nov. 16, 1961, Ser. No. 152,877
11 Claims. (Cl. 340—146.3)

This invention relates to reading machines and particularly to techniques for processing character-identity data internally of the reading machines.

As the term "character" is used herein, it means numerals, letters, symbols, words, patterns and/or portions thereof capable of being identified by machine. For brevity the term "character" is used throughout the specification and claims.

In general, character reading machines (either optical or magnetic) identify characters by scanning them and providing electrical outputs which correspond in one way or another to the configuration of each character. Special spiral scanners have been proposed, e.g. U.S. Patent No. 2,838,602 although most reading machines scan the character and its background by successive scan lines. These may be generated by an apertured disc, a cathode ray tube, a vertical row of photocells, etc. Another type of scanner which has been proposed, is a mosaic of photo-sensitive devices, the effect of which is to make a full examination of the entire character and its background area. In a sense, this is a full-field scan as opposed to multiple-line scanning which covers the entire field by a series of successive scan lines.

Most forms of the present invention do not rely on any particular scanner or scanning technique. The invention is more concerned with the processing of the data obtained by the scanner to prepare it for the decision section of the reading machine. One is commonly referred to as an absolute decision where the deciding means may be though of as an AND gate whereby all of the inputs, each relating to a particular piece, stroke, feature, etc. of a character, must be represented before the gate will produce a character-identity output. An absolute decision section identifies a character on the basis that the decision means has determined that the scanned unknown character fulfills all of the predetermined requirements of the decision means. Another concept which is followed in the construction of other decision sections of reading machines, is often referred to as a "best of match" decision, described and claimed in the J. Rabinow U.S. Patent No. 2,933,246. It determines the identity of a character by concluding that the unknown character is more like a particular character than any other character of a given group.

One of the features of this invention is that it may be used in connection with many combinations of decision section types and scanner-types.

Accordingly, an object of the invention is to provide unique means for processing scanning output data to prepare it for the decision section of a reading machine.

Another object of the invention is to provide data processing means as aforesaid, where the data involved are electrical signals used to induce currents in magnetic cores.

A still further object of the invention is to provide a unique read-out system for the scan data consisting of only a single wire for each character connected with predetermined cores.

Patent No. 3,104,369 of Rabinow et al. discloses a reading machine in considerable detail. That machine has a register into which the scan-data is gated for each character. Then, the information in the register is shifted to a predetermined position in the register to assure that when the register is sampled all of the character-defining data will be gated into the decision section of the machine. The significance of this feature is that if the character comes into the field of view of the scanner high or low, it will be stored correspondingly high or low in the register. Since transfer of the character-defining data from the register to the decision section is over a group of rigidly connected wires, the shifting feature of Rabinow et al. invention assures that all of the character data in the register will be in a predetermined position in the register to be gated into the decision section.

One of the basic objects of this invention is to provide a reading machine system wherein the "image" of a character (i.e. character-defining data) is stored at a height where the character occurs, and then by various alternative means, the image is transferred as a single simultaneous operation to a standard height where the character-data defining the "image" can be easily and accurately read out. The transfer operation can be thought of as having the effect of compressing the vertical dimension of the scanned height by excluding the vertical tolerance either above or below (or both) the character.

One of the advantages of the present invention is that the data processing means may be used with almost any type of scan apparatus and decision section of reading machines, and our data processing means greatly simplify the handling of the data to have it in a form and predetermined position suitable for the decision section of a machine.

Other objects and features of importance will become apparent in following the description of the illustrated forms of the invention which are given by way of example only.

FIGURE 1 is a pictorial view showing a character super-imposed on a grid and moving in such direction to be examined by a conventional scanner, this view showing also the loading of the scan data into a temporary storage, for instance a capacitor matrix, and means to remember the scan-character relative position to develop a signal which enables the capacitor matrix to be read out at a position corresponding to the character-scanner relative position.

FIGURE 2 is a schematic view showing another form of our invention.

FIGURE 3 is a diagrammatic view showing how a single read out wire for the character "C" is threaded through selected cores of a typical core matrix constituting a part of our invention, this view showing a single turn or loop around each core wound in one direction for the "assertions" and wound in the opposite direction for the "negations," the legends on FIGURE 3 showing that the C is recognized as such, not only, on the basis of points corresponding to the configuration of the C but also on the basis of not having character-piece information at points corresponding to those which would give rise to confusion between the characters C and O.

Figure 5:
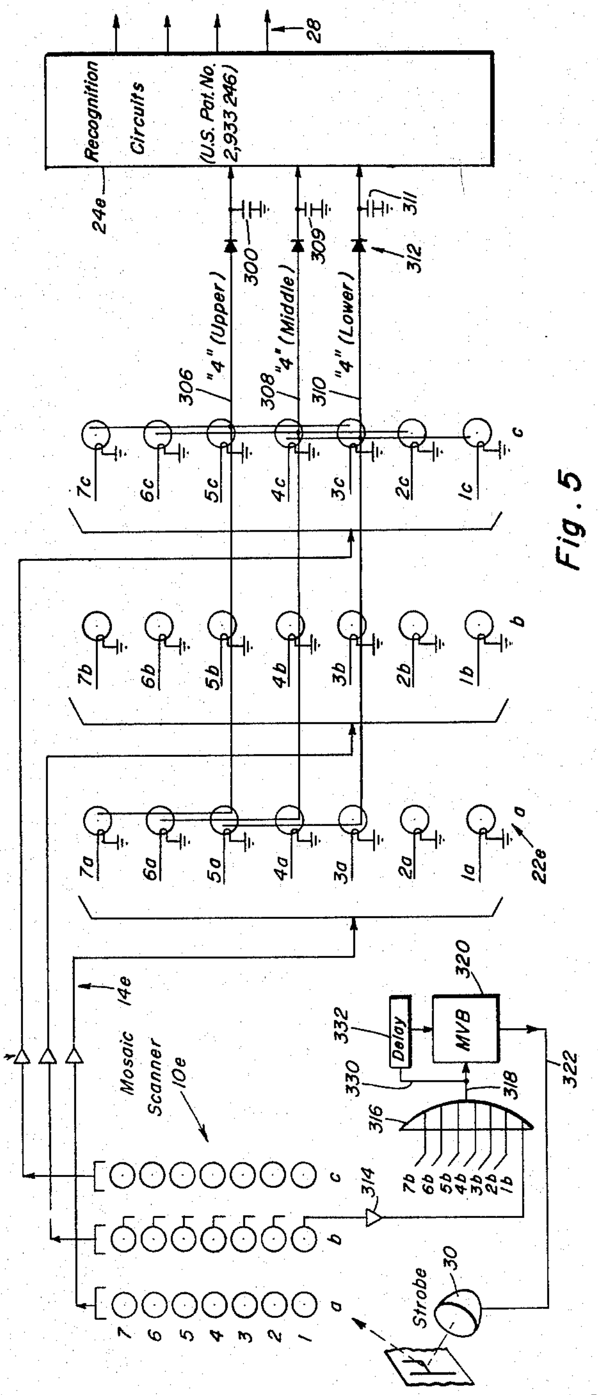
FIGURE 5 is a schematic view showing another form of the invention.
Figure 5A:
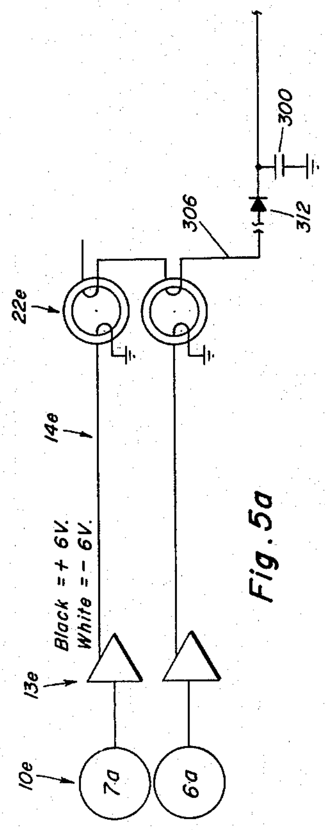

FIGURE 5*a* is an enlarged fragmentary detail showing two amplifiers' photocells in the scanner of FIGURE 5 and wiring connections with two cores.

*Preliminary explanation*

Figure 1:
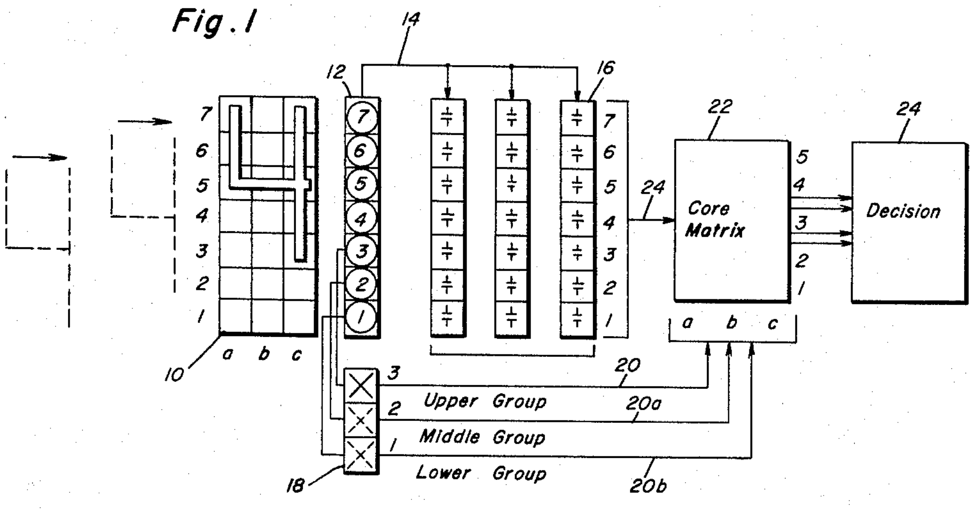

FIGURE 1 is diagrammatic view representing one of the forms of the invention. This figure shows three possible positions of a character "4" with respect to a scanner and that in at least some forms of our invention, we scan the character and identify it regardless of the vertical position of the character relative to the scanner. The character "4" shown in FIGURE 1 is superimposed on a grid 10 which is three units (*a–c*) wide and seven units (1–7) tall. The character itself is three units wide and five units tall, and it occupies columns *a–c*, rows 3–7 inclusive of the grid. Thus, to exemplify the operation of our invention we have selected a 3 x 5 proportioned font, it being obvious that any other proportions would be equivalent.

In actual practice, the practical way of scanning a character is to project its image on the scanner, shown as a vertical row 12 of photocells in the figure. The scanner may be clocked (referred to again later) as in the Rabinow et al. Patent No. 3,104,369, to examine the character along columns *a*, *b* and *c* as the character image is swept horizontally across the row of photocells, or as the row of photocells are moved across the image, or combinations of these movements.

The outputs of scanner 12, i.e. signals corresponding to the individual photocells "seeing" white (part of the background of the character) and "black" (part of the character image), are conducted along the wires of cable 14 and gated into a register 16 or the like (as in Patent No. 3,104,369) and in positions corresponding to those at which the character image is presented to the scanner. In FIGURE 1 the character image of the "4" in full lines is high relative to the scanner and therefore the register 16 is loaded at the upper positions thereof corresponding to rows 3–7 of photocells in the scanner.

A memory device forming a height-detector 18 is operatively connected with photocells 1–3 of the scanner 12. In addition to the information output signals conducted on the wires of cable 14, the memory device keeps track of the position of the character as it is being scanned. An output signal is ultimately developed on one of the three output lines **20–20*b* inclusive, of memory device 18. This signal, for instance, the signal on line 20 (corresponding to position 3 of memory device 18) is used to determine which portion of the register 16 to interrogate to gather the scan-data information from the register and normalize it in a core matrix 22 which arranges the character-identity data at a standard height, regardless of where the data is vertically positioned in matrix 16**.

Figure 2:
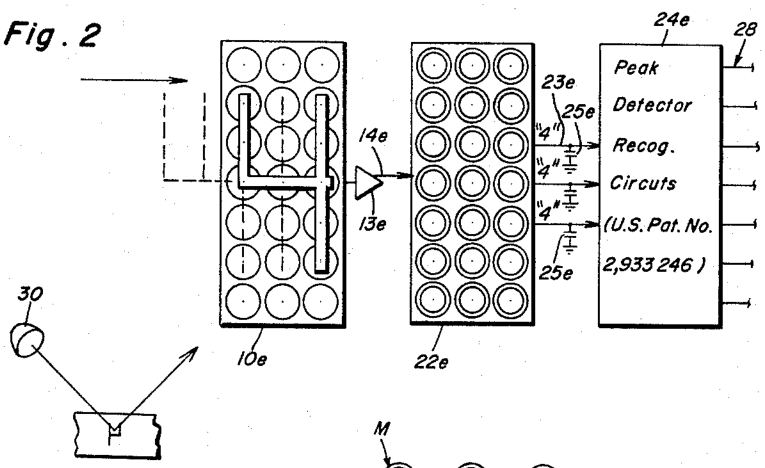

FIGURE 2 is a diagrammatic view corresponding to the system which is disclosed more fully in FIGURES 5 and 5a. In this form of our invention the scanner **10*e* is composed of a full mosaic of photocells whereby the scanner makes a full examination of the entire character image in contrast to sequential line scanning as has been mentioned previously. Individual lines from each photocell with individual amplifiers in each line are diagrammatically represented by line 14*e* and amplifier 13*e*. The individual lines are connected with the cores of core matrix 22*e* from which character read out lines 23*e* extend. Three lines are shown, each having a storage capacitor 25*e*** therein, the three lines representing the three possible vertical positions of the character image as it appears on the mosaic scanner. Thus, in this form of our invention we have tolerance for the character-scanner relative positions just as in the previously discussed forms of our invention, but the vertical tolerance is provided for in a different way.

The mode of operation shown in FIGURE 2 is somewhat different from that described above. We use a peak detector recognition circuit **24*e* which is either the same or very similar to that disclosed in the J. Rabinow U.S. Patent No. 2,933,246. In principle, as the character image moves across the face of scanner 10*e*, there will be a position at which the signal from the core matrix 22*e* is optimum thereby providing a "peak" which is detected by the recognition circuits, and this is used to provide an output signal on one of the lines, for instance line 28 from the decision section 24*e***.

To enable the core matrix to function in its intended way (FIG. 2) and the peak detector recognition circuits to cooperate therewith, the scanning must operate in an A.C. mode (to have current induction in the cores as will be described in detail later), and we have a simple way of achieving this. The illumination for the character to produce the image on the scanner is a stroboscopic light 30, although the same result could be used with an ordinary source of illumination which is chopped, for instance by a blanking disc which is rotatable between the source and the character or between the character and the scanner.

Figure 3:
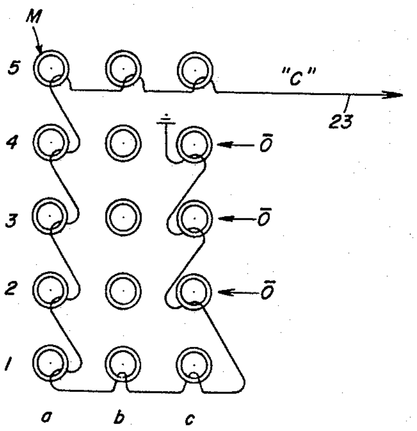

FIGURE 3 shows a typical read wire 23 connected with a core matrix. This figure shows a matrix M of magnetic cores in three columns and five horizontal rows. Therefore, it may be considered to be representative of the cores in matrix 22 of FIGURE 1. We have one readout wire 23 which is threaded through certain of the cores. All of the cores of rows 5 and 1 are selected, and so are all of the cores of column *a*. The windings of the wire 23 are in the same direction on all of these cores. These ultimately provide assertions at the points represented by the selected cores. In addition, wire 23 is wound on cores 2*c*, 3*c*, and 4*c*, but in the opposite direction from the windings on the other cores. When current is induced in the cores by means not shown in FIGURE 1 but shown in detail in other figures, the polarities of the induced current will be in one direction for the assertion cores, but the opposite direction for the negation cores 2*c*, 3*c*, and 4*c*. Thus, if there is no piece of the character image seen (by the scanner) at points corresponding to 2*c*, 3*c* and 4*c*, the signal induced on line 23 will be increased in proportion thereto. The effect is that for the recognition of the letter "C" we determine that the unknown character has points (black) at all of the positions of column *a* and rows 1 and 5 and also no "blacks" at positions 2*c*, 3*c* and 4*c*. This enables us to clearly distinguish the C from an O.

Although FIGURE 3 shows one readout wire 23 for one character in a complete reading machine the cores will have many read out wires, each having a coil-coupling (forming a transformer) with cores that are preselected in accordance with the configuration of the character which is expected to be read. FIGURE 3 shows the readout wire with a single turn on each of the selected cores. If it is desired to emphasize the importance of certain points, more than one turn is placed around the core. In many instances, the wires in other figures of the drawings are not shown looped around the cores, for to do so would cause confusion in the drawings between the loops and cores. However, it is to be understood that all wire-core couplings are made by windings of the wires on the cores, for instance as shown in FIGURES 3 and 5*a*.

Figure 4:
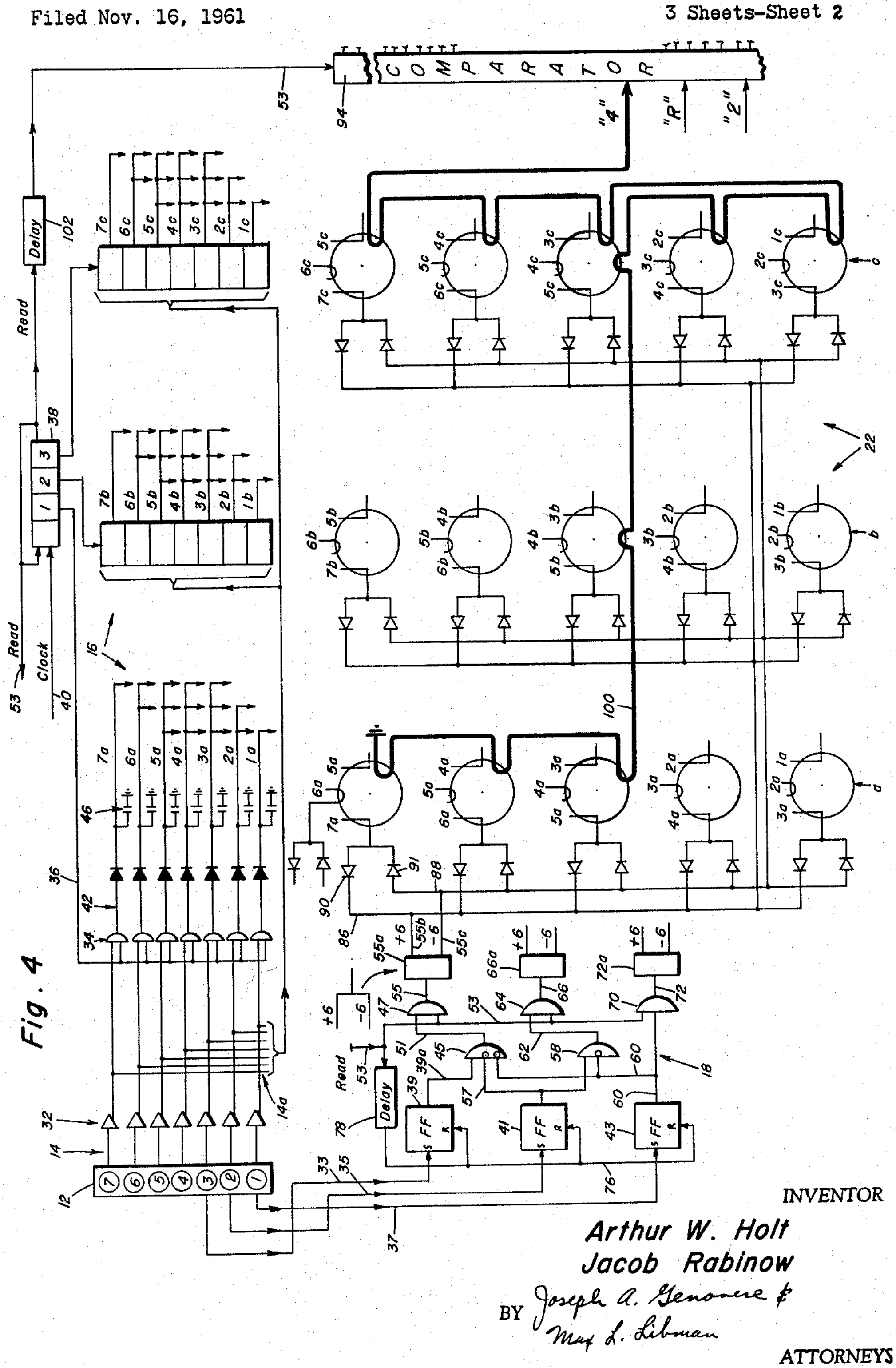
FIGURE 4 is a schematic view showing one form of the invention.

*System of FIGURE 4*

FIGURE 4 shows a multi-photocell scanner 12 operating as a vertical line scanner as shown in FIGURE 1. The information output lines 14 from the individual photocells have amplifiers 32 interposed therein. The amplifiers are so designed that they provide amplified outputs proportional to the light seen by the photocells. For instance, assume when a photocell sees "black," the amplified output on its line 14 will be plus 6 volts. When the photocell sees gray, the amplified output on line 14 will be 0 volts, and when the photocell sees white, the output on line 14 will be −6 volts.

The capacitor matrix 16 (FIGURE 1) is shown with some of its control circuitry in FIGURE 4. The purpose of the matrix 16 is to store the scanner outputs (character-defining data) at the vertical position at which the character is scanned. It is later shown how the data is reduced to a standard position (in the core matrix 22) for accurate character recognition regardless of whether the image of the unknown character is scanned at high, intermediate or low positions.

Matrix 16 is shown as three vertical columns of capacitors and diodes, each column having a set of input AND gates. One set of capacitors and gates is shown in detail in FIGURE 4, the other two sets being identical. They operate as follows: The scanner output lines 14 form respective inputs of the column 34 of AND gates, and the other input is the signal on line 36. Line 36 is an output of a ring counter 38, the latter being operated by clock signals on line 40 synchronized with horizontal movement of the character image. Thus, as the character image horizontally moves across scanner 12, counter 38 steps to position "1" and provides a signal on line 36 which interrogates gates 34. The output lines 42 of gates 34 will, as a result, conduct signals in the range of +6 to −6 volts depending on the optical density of the sub-area investigated by the associated photocell of scanner 12. These signals are stored in the capacitors 46 connected to lines 42. Of course, for diodes to be used as shown, the capacitors must be all charged to −6 v. at the end of each character. Alternatively, the diodes could be omitted and the gates 34 be analog AND gates passing negative or positive signals corresponding to the signals on lines 42.

When counter 38 steps to position "2," the second column of matrix 16 (shown as a vertical rectangle) is loaded in the same manner. Lines 14*a* are connected to lines 14, and they form inputs to AND gates (not shown) of the second column of register 16 to conduct character-data for the second scan to the second column of capacitors. Then, when the counter steps to stage "3," the third column of capacitors are similarly loaded.

The entire procedure described above is similar to the loading of the flip-flop register disclosed in Patent No. 3,104,369. In fact, for a digital system, we could use flip flop instead of capacitors in register 16, but would not have the benefit of analog storage (capacitor charges proportional to optical density of the unknown character and its background). Furthermore, capacitors cost less than flip flops.

The output lines from the capacitors are identified as 1*a*–7*c* inclusive to correspond to the positions of grid 10 of FIGURE 1. Similar line-identification is used for these lines as connected with the cores of matrix 22 (described later).

*Height detector*

As previously described, the character-to-scanner relative position may be low, intermediate or high. The height detector memory 18 remembers this position as follows: Lines 33, 35 and 37 are connected with the output lines 14 of photocells 3, 2 and 1 respectively. Three flip flops 39, 41 and 43 are connected to the respective lines 33, 35 and 37, and the flip flops are made to respond to signals corresponding to photocells 1–3 seeing a piece of a character. Thus, if a character is scanned high on the scanner, only flip flop 39 will be set, producing an output signal on its line 39*a*. This signal is applied to an inhibit AND gate 45 whose inhibit signals are obtained from flip flops 41 and 43 which, in our example, are not set. Therefore, the signal on line 39*a* will pass gate 45 and be applied to gate 47 by way of line 51. Gate 47 is an AND gate whose only other input is on line 53 which conducts a "read" signal when the character has been scanned, e.g. slightly after counter 38 has stepped to position "3." Thus, there is coincidence of signals at gate 47 at the time that the character information derived from scanning the character is to be interpreted and the character identified. The output signal on line 55 from gate 47 corresponds to the output signal on line 20 of FIGURE 1, except there is a pulse generator 55*a* connected to line 55, which provides an output which swings between +6 and −6 volts for reasons to be described later.

Now assume that the character was scanned by photocells 2–6 inclusive, in which case there would be signals on both lines 33 and 35 to set both flip flops 39 and 41. The flop flop 39 would provide an output signal on line 39*a* as before. However, the output line 57 from flip flop 41 would inhibit gate 45 so that there is no signal on line 51 to gate 47. Line 57 is also used as an input to inhibit gate 58. The inhibit signal for gate 58 is on line 60 from flip flop 43, and since this flip flop is not set, gate 58 will pass a signal on line 62 to AND gate 64. The other input to AND gate 64 is the read signal on line 53. Thus, line 66 from gate 64 will conduct the signal to pulse generator 66*a* which is the same as pulse generator 55*a*. Line 20*a* of FIGURE 1 corresponds to line 66.

Now consider the situation where the character is scanned "low," i.e. by photocells 1–5 inclusive. All three of the lines 33, 35 and 37 will conduct a signal to the three flip flops 39, 41 and 43. Gate 45 is inhibited as aforesaid, and so is gate 58 because there is an output from the flip flop 43 on line 60 going to the inhibit terminal of gate 58. Line 60 provides an input to gate 70 whose other input is the "read" signal on line 53. Consequently, the output line 72 of AND gate 70 conducts a signal to the pulse generator 72*a*. Line 20*b* of FIGURE 1 corresponds to line 74 of FIGURE 4. The three flip flops 39, 41 and 43 reset by a signal on line 76 which may be derived in many ways, for instance by the "read" signal on line 53 which is delayed at 78. When the flip flops are reset, they are in condition for detecting and remembering the height of the next character which is scanned.

The above described gating has the effect of interrogating the photocells to ascertain what the photocells see at three successive vertical positions as the character image moves across the face of the scanner. Obviously, the number of scans could be increased by increasing the number of columns of gates and capacitors (upper part of FIGURE 4) and correspondingly enlarging the ring counter 38.

*Core matrix*

The core matrix 22 (FIGURE 1) is shown in detail in FIGURE 4. Note that the core matrix is composed of three columns *a*, *b* and *c* but the columns are only five cores high instead of seven to correspond to the seven photocells and/or the seven tiers of capacitors. The character data stored in the capacitors is compressed to the five-level total height in the following way: Capacitor lines 3*a*–7*a*, 3*b*–7*b* and 3*c*–7*c* inclusive are individually wound on the cores of matrix 22. This includes all of the cores, i.e. there are fifteen lines in this group and fifteen cores. Capacitor lines 2*a*–6*a*, 2*b*–6*b*, and 2*c*–6*c* are connected to all of the respective cores; and lines 1*a*–5*a*, 1*b*–5*b* and 1*c*–5*c* are connected to all of the respective cores. Thus, we have three sets of connections between the cores and capacitors, one set corresponding to each of the possible character position heights.

Height detector 18 remembers at which height the unknown character is scanned. Thus, this information is used to interrogate the corresponding set of capacitor wires wound on the cores. This is done as follows: FIGURE 4 shows pulse generator 55*a* connected with the upper set of capacitor wires, i.e. 3*a*–7*a*, 3*b*–7*b* and 3*c*–7*c*. The pulse generators 66*a* and 72*a* similarly connected, but to the middle and lower groups of capacitor wires. Physical connection is made between the capacitor wires by lines 55*b* and 55*c*, which are the positive and negative outputs of pulse generator 55*a*, and buses 86 and 88. Forward and rearward diode pairs (e.g. diodes 90 and 91 for capacitor-core line 7*a* at the upper left corner of matrix 22 in FIGURE 4). Hence, when the upper pulse generator 55*a* fires, the set 3*a*–7*a*, etc., of capacitors are discharged over their lines to induce magnetic signals in the cores which correspond in strength and direction to the optical density of the scanned pieces of the character. If the character had been scanned low, the operation would be the same but generator 72*a* would have fired, and capacitor lines 1*a*–5*a*, etc., would have been interrogated.

The above describes how the data stored by the capacitors is compressed to fit the core matrix 22. The magnetic signals induced in the cores are read out by a single wire for each character threaded through cores (as a secondary winding) which are preselected in accordance with the shape of the character that the read out wire represents. We have shown wire 100 for the character "4" in FIGURE 4. One end is grounded and the other end is an input to comparator 94 whose details form no part of our present invention. It may be constructed like the comparator in Patent No. 3,104,369 and gated on by the "read" signal on line 53, delayed as at 102. We have shown another "read" out wire 23 in FIGURE 3 (for the character "C") to illustrate how assertions and negations ("not" functions) are obtained.

*FIGURES 5 and 5a*

FIGURE 2 shows, in a general way, the mode of operation of the reading system in FIGURES 5 and 5*a*. Although we have previously indicated that any type of scanner could be used with the various forms of the invention, a photocell mosaic scanner 10*e* offers a number of advantages. One of the difficulties with many existing reading machines is complexity. They are usually costly. The system in FIGURE 5, using a mosaic scanner, materially reduces construction costs. No gating as shown in FIGURE 4 is required in a machine constructed along the lines of FIGURE 5. This, in itself, provides for appreciable economy. Secondly, the machine system in FIGURE 5 has only one capacitor, for example, capacitor 300 (right side of FIGURE 5) as the storage element for one character. If the machine is designed to identify ten characters, say the numerals 0–9 inclusive, the entire memory of the machine would be composed of ten capacitors and if the machine is to have the feature of reading the character where scanned, regardless of its vertical position with respect to the scanner, the number of memory capacitors involved is not greatly increased since we require only one capacitor for each read out wire.

As described in connection with FIGURE 2, we have a strobe light 30 or the equivalent (a light chopper, etc.) for illumination of the unknown characters. The mosaic scanner 10*e* is composed of columns *a*, *b* and *c* and rows 1–7 of photocells when the machine is designed to read characters whose proprotions are in a 3 x 5 font. The photocells of a column *a* have individual wires and amplifiers diagrammatically represented at 14*e* and 13*e* respectively, connected with the cores of column *a* of core matrix 22*e*. The legends applied to the wires of matrix 22*e* explain the photocell amplifier-core connections. Column *b* of photocells are similarly connected with the cores of column *b* of core matrix 22*e*, and column *c* of the scanner 10*e* has its individual photocells respectively connected with the cores of column *c* in the core matrix 22*e*.

Since we are discussing a 3 x 5 font proportion and have a 3 x 7 scanner, vertical registration tolerance would be two units, i.e. the character may assume an upper position (photocell rows 3–7), a middle position (photocells 2–6) or a lower position (photocells rows 1–5). Just as in FIGURE 4, there is a single read out wire threaded through preselected cores in accordance with the configuration of the character which the machine is expected to read. Also, it is understood that the same core matrix 22*e* will have a single read out wire for each character that the machine is expected to read, and it will be coil-coupled with cores in a pattern corresponding to the configuration of the character with which it is associated.

FIGURE 5 shows only three read-out wires, each for the numeral "4" but each at a different vertical level in the matrix 22*e*. Therefore, the wires 306, 308 and 310 are used to read out the numeral "4" from the core matrix at the three discussed levels (upper, middle and lower). Each read out wire has a capacitor or the equivalent, there being capacitors 300, 309 and 311 going to ground and connected to each of the read-out wires. The capacitors are coupled to the read-out wires behind diodes 312 or equivalent unidirectional devices.

FIGURE 5*a* shows actual coupling connections between two of the conductors in cable 14*e* and two of the cores of core matrix 22*e*. The wires are wound with a single turn on each of the cores and go to ground. The read out wire 306 is also coil-coupled to the two cores, in effect forming the secondary of a transformer whose other components are the cores and information carrying lines from amplifiers 13*e*. Amplifiers 13*e* are the same as described in connection with FIGURE 2, i.e. for "black" (part of the character image), there is a plus six volt output and for white (part of the character background) there is a minus six volt output. Different gradations of grey will provide output voltages between minus and plus six volts proportional to the darkness of the character image.

FIGURE 2 shows the character "4" in three different horizontal positions, two of them in dotted lines and one in full lines. This represents the character moving across the face of the scanner 10*e*. When the character is in the first position so that the leading edge of the character covers one or more of the photocells in column *a* of scanner 10*e*, essentially nothing happens in the circuitry shown in FIGURE 5 because signals are induced in the read-out wire 306, 308, etc., when the magnetic fields of the cores are collapsed and formed. The change in the field of each core induces the output signal. Assume that the character moves farther to the right as shown in FIGURE 5 and one or more of the photocells in column *b* sees a part of the character image. In addition, to the information outputs conducted on cable 14*e*, there are individual lines 1*b*–7*b* inclusive with amplifiers 314 interposed therein, connected with the photocells of column *b* and an OR gate 316. The amplifiers 314 are such that when the photocell sees grey or black, an output is provided to OR gate so that the output line 318 of the OR gate conducts a signal to a multivibrator 320. Accordingly, column *b* of the photocells in 10*e* serves not only as an information gathering means but also as a control to trigger a pulse generator, for instance, multivibrator 320. The signal on output line 322 of the multivibrator operates the strobe light 30 at a predetermined frequency. Thus, the effect is that of chopping the light. As the character continues to move across the face of the scanner 10*e*, the light is chopped so that the cores of the matrix 22*e* receive information in an alternating mode, i.e. the incoming signals are in bursts whose frequency is a function of the frequency of the strobe light 30. There is a corresponding rising and falling of the magnetic fields about each of the cores whereby the memory capacitors 300, 309 and 311 in the illustrated example, continue to store charges proportional to the degree of match between the incoming signals to the various cores.

The recognition circuits in the decision section 24*e* are the same as in FIGURE 2 of U.S. Patent No. 2,933,246 which are designed to detect peaks. When a peak is reached on one of the capacitors higher than the others and just begins to fall, the recognition circuits 24*e*, as described in the referred to patent, produce a recognition signal on one of the recognition wires 28 thereby identifying the character. In this case the character will be identified as a "4." The recognition signal may be used for resetting the multivibrator 320 so that the strobe light 30, or the multivibrator may be turned off by a signal on line 330 which is fed back from line 318 to the reset terminal of the multivibrator, but delayed as at 332. The multivibrator 320 is given only as one possible example of how to operate the strobe light. It may be substituted by a flip flop which merely turns on and turns off the strobe light or any other commonly used logic component or sub-assembly.

Although several forms of the invention are illustrated and these together with certain minor variations are described herein, it is understood that these are given by way of example only and that many other variations and changes may be made without departing from the protection of the following claims. For instance, the height detector 18 (FIGURE 4) may be used in ways other than shown. It could be used as a control to select which of the readout wires 306, 308, 310 (or the equivalent) to use for a given character-scan height.

We claim:

1. In a reading machine having an examination device which is taller than an unknown character to provide vertical tolerance for the examination of an unknown character, means connected with said examination device to provide signals which correspond to the character and its background, means for storing said signals as a group and at a position corresponding to the relative position of the character when examined, a matrix of memory devices to receive said group of signals, said matrix being vertically shorter than said storing means to receive said group of stored signals at a predetermined position regardless of the position of said group of signals in said storing means, and recognition means operatively connected with said devices to identify the unknown character on the basis of said group of signals.

2. The reading machine of claim 1 and a height detector for providing a signal corresponding to the vertical position at which the character is examined, and means responsive to the last-mentioned signal for triggering the transfer of said group of signals from said storing means to said devices.

3. The reading machine of claim 2 wherein said memory devices are magnetic cores, and said recognition means include conductors connected with predetermined cores.

4. In a character reading machine having a scanner which is taller than the character on its background thereby providing vertical scan tolerance for the character, means providing scanner outputs which correspond to the optical density of the sub areas making up the character and its background, storage means to store said outputs, a magnetic core matrix, sets of conductors connected to groups of points of said storage means corresponding to different scan levels, said sets of conductors also operatively connected by coils with said cores, means to detect the level at which the character is scanned and to provide a shift signal for said outputs on that group of conductors which correspond to the vertical height at which the character is scanned for inducing currents in said cores which correspond to the pattern of said stored outputs, and means for interrogating cores which are preselected in accordance with the shape of an unknown character.

5. In a reading machine which has a scanner and means to provide outputs from the scaner which vary in accordance with the optical density of an image presentation of the character and its background, the improvement comprising a matrix of cores, the cores individually connected with respective output means of said scanner, read out means connected with predetermined cores, there being one read out means for each character, peak detector recognition circuits operatively connected with said read out means, and means for interrupting the image presentation of the character to said scanner so that the outputs of the scanner are correspondingly interrupted thereby causing the magnetic fields associated with said cores to be generated and collapsed for inducing signals into said read out means.

6. The reading machine of claim 5 wherein said interrupting means include a strobe light, and means connected with a part of said scanner for energizing said strobe light when a part of the character image covers at least a portion of said part of said scanner.

7. The reading machine of claim 5 wherein there is more than one read out means for each character, and said more than one read out means corresponding to different vertical registration positions of the scanned character.

8. The reading machine of claim 7 wherein said read out means include conductors which are coil-coupled with said cores, and the coil coupling being wound in one direction to provide assertion outputs and wound in the other direction on at least one of said cores to provide negation information at the output thereof.

9. In a reading machine which has a scanner and a comparator, said scanner being taller than the height of the character to provide vertical tolerance during the scanning of the character, means to remember the vertical position relative to said scanner at which the character is scanned, character information conducting means for the full height of a character operatively connected with a first portion of said scanner, a core matrix with which the last mentioned means are also connected, second character information conducting means connected to the same cores of said matrix but with a different portion of said scanner whereby the character information from the scanner is applied to the same cores regardless of the character-scanner relative position during scanning, a single read out means for each character, said read out means operatively connected with predetermined cores of said matrix depending on the character configuration expected to be read, and means responsive to the remembered vertical position of said character during scanning by said memory means for interrogating one group of said character information conducting means on said cores to thereby induce a signal into said read out means which is applied to said comparator.

10. The reading machine of claim 9 wherein said means for conducting character-identity information to said cores include for each core, a coil thereon, a pair of diodes connected in parallel and to said conductor, said diodes being reversed relative to each other, and said memory means providing a set of output signals, one of which is applied to the respective diodes of said pairs.

11. In a character reading machine having a scanner, said scanner covering a taller area than the character, output means connected with said scanner and providing signals indicative of portions of the character and its background, one group of said output means corresponding to the upper part of said scanner and another group of said output means corresponding to a lower part of said scanner, a magnetic core matrix for servicing the signals conducted by both of said groups of output means, said core matrix being vertically shorter than said scanner and owing to the servicing of both of said groups of output means said matrix having the effect of vertically compressing the scanned area by effectively excluding the vertical tolerance area above or below the character from said matrix, a plurality of read out means connected with cores of said matrix and the cores being selected in accordance with the configuration of the character expected to be read, there being one output means for each character, said output means having a coil coupling with said predetermined cores, and a comparator with which said output means are operatively connected.

References Cited by the Examiner

UNITED STATES PATENTS

| | | | |
|---|---|---|---|
| 2,932,006 | 4/60 | Glauberman | 340—146.3 |
| 2,964,238 | 12/60 | King | 340—146.3 |
| 2,978,675 | 4/61 | Highleyman | 340—146.3 |
| 3,003,143 | 10/61 | Beurrier | 340—173 |
| 3,011,156 | 11/61 | MacPherson | 340—173 |

MALCOLM A. MORRISON, *Primary Examiner.*